US012722346B2

(12) United States Patent
Vashisth et al.

(10) Patent No.: US 12,722,346 B2
(45) Date of Patent: Sep. 1, 2026

(54) CLOSED LOOP COMPOSITE WELDING AND BONDING SYSTEM USING RADIO-FREQUENCY AND PRESSURE

(71) Applicant: UNIVERSITY OF WASHINGTON, Seattle, WA (US)

(72) Inventors: Aniruddh Vashisth, Seattle, WA (US); Santosh Devasia, Seattle, WA (US); Ian Enriquez, Seattle, WA (US); Katrina Teo, Seattle, WA (US); Colin A. Noronha, Seattle, WA (US)

(73) Assignee: University of Washington, Seattle, WA (US)

( * ) Notice: Subject to any disclaimer, the term of this patent is extended or adjusted under 35 U.S.C. 154(b) by 214 days.

(21) Appl. No.: 18/573,016

(22) PCT Filed: Jun. 21, 2022

(86) PCT No.: PCT/US2022/034250

§ 371 (c)(1),
(2) Date: Dec. 21, 2023

(87) PCT Pub. No.: WO2022/271633

PCT Pub. Date: Dec. 29, 2022

(65) Prior Publication Data

US 2024/0286363 A1 Aug. 29, 2024

Related U.S. Application Data

(60) Provisional application No. 63/366,680, filed on Jun. 20, 2022, provisional application No. 63/212,995, filed on Jun. 21, 2021.

(51) Int. Cl.
*B29C 65/00* (2006.01)
*B29C 65/04* (2006.01)
(Continued)

(52) U.S. Cl.
CPC ........ *B29C 66/91221* (2013.01); *B29C 65/04* (2013.01); *B29C 66/73141* (2013.01);
(Continued)

(58) Field of Classification Search
CPC . B29C 65/04; B29C 65/3408; B29C 65/3412; B29C 65/3416; B29C 65/3476;
(Continued)

(56) References Cited

U.S. PATENT DOCUMENTS 1,092,373 A 4/1914 Long
3,620,875 A * 11/1971 Guglielmo, Sr. ... B29C 65/4855 156/275.3
(Continued)

FOREIGN PATENT DOCUMENTS

CN 202846891 U 4/2013
CN 206201495 U 5/2017
(Continued)

OTHER PUBLICATIONS

Ineos, "Typical Engineering Properties of Polyproylene", Apr. 2014.*
(Continued)

*Primary Examiner* — John L Goff, II
(74) *Attorney, Agent, or Firm* — McDonnell Boehnen Hulbert & Berghoff LLP

(57) ABSTRACT

A bonding system includes a heating element, an actuator, an infrared camera, a pressure sensor and/or a displacement sensor, one or more processors, and a computer readable medium storing instructions that, when executed by the one or more processors, cause the bonding system to perform functions including providing a first control signal to a heating element, thereby heating a workpiece with electromagnetic radiation having one or more oscillation frequencies within a range of 1 MHz to 2.00 MHz. and providing a second control signal to an actuator, thereby applying a
(Continued)

pressure to the workpiece via the actuator. The functions also include detecting a temperature of the workpiece, the pressure applied to the workpiece, and/or a displacement of the actuator, and adjusting the first control signal and/or the second control signal based on the temperature of the workpiece, the pressure applied to the workpiece, or the displacement of the actuator.

19 Claims, 13 Drawing Sheets

(51) Int. Cl.
*B29K 67/00* (2006.01)
*B29K 71/00* (2006.01)
*B29K 105/16* (2006.01)
*B29K 507/04* (2006.01)

(52) U.S. Cl.
CPC .... *B29C 66/9241* (2013.01); *B29C 66/92611* (2013.01); *B29K 2067/046* (2013.01); *B29K 2071/00* (2013.01); *B29K 2105/16* (2013.01); *B29K 2507/04* (2013.01); *B29K 2995/0005* (2013.01)

(58) Field of Classification Search
CPC . B29C 65/3492; B29C 65/36; B29C 65/3608; B29C 65/3612; B29C 65/3616; B29C 65/3676; B29C 65/14; B29C 66/9121; B29C 66/91211; B29C 66/91216; B29C 66/91221; B29C 66/91411; B29C 66/91651; B29C 66/91653; B29C 66/91655; B29C 66/922; B29C 66/9221; B29C 66/92211; B29C 66/9231; B29C 66/92311; B29C 66/924; B29C 66/9241; B29C 66/9261; B29C 66/92611; B29C 66/961; B29C 66/91213; B29C 66/91315; B29C 66/91317; B29C 66/90–98; B29C 66/73141; B29C 65/00; B29C 65/32; B29C 65/82; B29K 2067/046; B29K 2071/00; B29K 2105/16; B29K 2507/04; B29K 2995/0005; H05B 2203/032; H05B 1/023
USPC ............... 156/64, 272.4, 352, 358, 359, 368
See application file for complete search history.

(56) References Cited

U.S. PATENT DOCUMENTS

| | | | | |
|---|---|---|---|---|
| 4,673,541 | A | 6/1987 | Watanabe et al. | |
| 4,978,825 | A | 12/1990 | Schmidt et al. | |
| 5,240,542 | A | 8/1993 | Miller et al. | |
| 5,712,044 | A * | 1/1998 | Fanselow | B29C 66/723 428/510 |
| 6,323,468 | B1 | 11/2001 | Dabelstein et al. | |
| 6,346,210 | B1 | 2/2002 | Swartz et al. | |
| 6,914,406 | B1 * | 7/2005 | Wilkes | B30B 1/103 318/566 |
| 9,446,574 | B2 | 9/2016 | Zimmerer et al. | |
| 9,963,978 | B2 | 5/2018 | Johnson et al. | |
| 10,542,589 | B2 | 1/2020 | Rios et al. | |
| 10,747,202 | B2 | 8/2020 | Blom et al. | |
| 10,899,089 | B2 | 1/2021 | Webb | |
| 11,279,085 | B2 | 3/2022 | Stockett et al. | |
| 2002/0079121 | A1 * | 6/2002 | Ryan | B29C 65/3644 156/384 |
| 2018/0126609 | A1 | 5/2018 | Kamihara et al. | |
| 2019/0143559 | A1 | 5/2019 | Abbott, Jr. et al. | |
| 2020/0039153 | A1 | 2/2020 | Giurgiutiu et al. | |
| 2020/0086583 | A1 | 3/2020 | Rhodes, Jr. et al. | |
| 2020/0317957 | A1 | 10/2020 | Sweeney et al. | |
| 2020/0354531 | A1 | 11/2020 | Vashisth et al. | |
| 2021/0324245 | A1 | 10/2021 | Zhang et al. | |
| 2022/0193784 | A1 | 6/2022 | Hiller | |
| 2022/0193994 | A1 | 6/2022 | Li et al. | |
| 2023/0279276 | A1 | 9/2023 | Green et al. | |

FOREIGN PATENT DOCUMENTS

| | | | | |
|---|---|---|---|---|
| CN | 206326867 | U | 7/2017 | |
| CN | 108819292 | | 11/2018 | |
| CN | 110186570 | A | 8/2019 | |
| CN | 111965171 | A | 11/2020 | |
| CN | 114701176 | A | 7/2022 | |
| EP | 0924053 | | 7/2004 | |
| EP | 3711931 | A1 * | 9/2020 | B29C 65/2061 |
| GB | 1092373 | A | 11/1967 | |
| WO | 2022/271633 | A1 | 12/2022 | |
| WO | 2023/249936 | A1 | 12/2023 | |

OTHER PUBLICATIONS

Armendariz, E. R., "Development of a Laser Solder Process for use with Material Extrusion Additive Manufacturing and Rapid Electronics Prototyping in Embedded Sensing Applications", Mechanical Engineering Commons, 2021, 158 pages.
International Search Report (ISR) with Written Opinion issued in Int'l Application No. PCT/US2023/025714, mailed Dec. 28, 2023, 8 pages.
The International Search Report (ISR) with Written Opinion for PCT/US2022/034250 dated Oct. 6, 2022, pp. 1-11.
Humbert et al., "Advanced Measurement, Characterization and Simulation of Thermoplastic Composite Induction Welding", KMUTNB International Journal of Applied Science and Technology, 2014, 7(4), 12 pages.
Lionetto et al., "Finite element modeling of continuous induction welding of thermoplastic matrix composites", Materials & Design, 2017, vol. 120, 212-221.
Green, Micah J. et al., U.S. Appl. No. 63/060,202, filed Aug. 3, 2020, entitled "Bonding Dissimilar Materials Using Radio Frequency Wave Curing".
Assadi, Michael D., "High Speed AFP Processing of Thermoplastics.", Electroimpact Inc. 2021, 8 pages.
Francesco, M. D. et al., "Heater power control for multi-material, variable speed Automated Fibre Placement", Composites Part A: Applied Science and Manufacturing, 2017, vol. 101, 408-421.
Boon, Y. D. et al., "Review: Filament Winding and Automated Fiber Placement with In Situ Consolidation for Fiber Reinforced Thermoplastic Polymer Composites.", Polymers, 2021, vol. 13, 29 pages.
Shen et al., "The harmful factors affect human health and preventative measures in welding process", IEEE, 2010, 4 pages.
Mahbub et al., "Pattern-Dependent Radio Frequency Heating of Laser-Induced Graphene Flexible Heaters", ACS Applied Materials and Interfaces, 2023, 15(14), 18074-18086.

* cited by examiner

PROVIDING A FIRST CONTROL SIGNAL TO A HEATING ELEMENT, THEREBY HEATING A WORKPIECE WITH ELECTROMAGNETIC RADIATION HAVING ONE OR MORE OSCILLATION FREQUENCIES WITHIN A RANGE OF 1 MHZ TO 200 MHZ

402

PROVIDING A SECOND CONTROL SIGNAL TO AN ACTUATOR, THEREBY APPLYING A PRESSURE TO THE WORKPIECE VIA THE ACTUATOR

404

DETECTING A TEMPERATURE OF THE WORKPIECE, THE PRESSURE APPLIED TO THE WORKPIECE, AND/OR A DISPLACEMENT OF THE ACTUATOR

406

ADJUSTING THE FIRST CONTROL SIGNAL AND/OR THE SECOND CONTROL SIGNAL BASED ON THE TEMPERATURE OF THE WORKPIECE, THE PRESSURE APPLIED TO THE WORKPIECE, OR THE DISPLACEMENT OF THE ACTUATOR

408

400

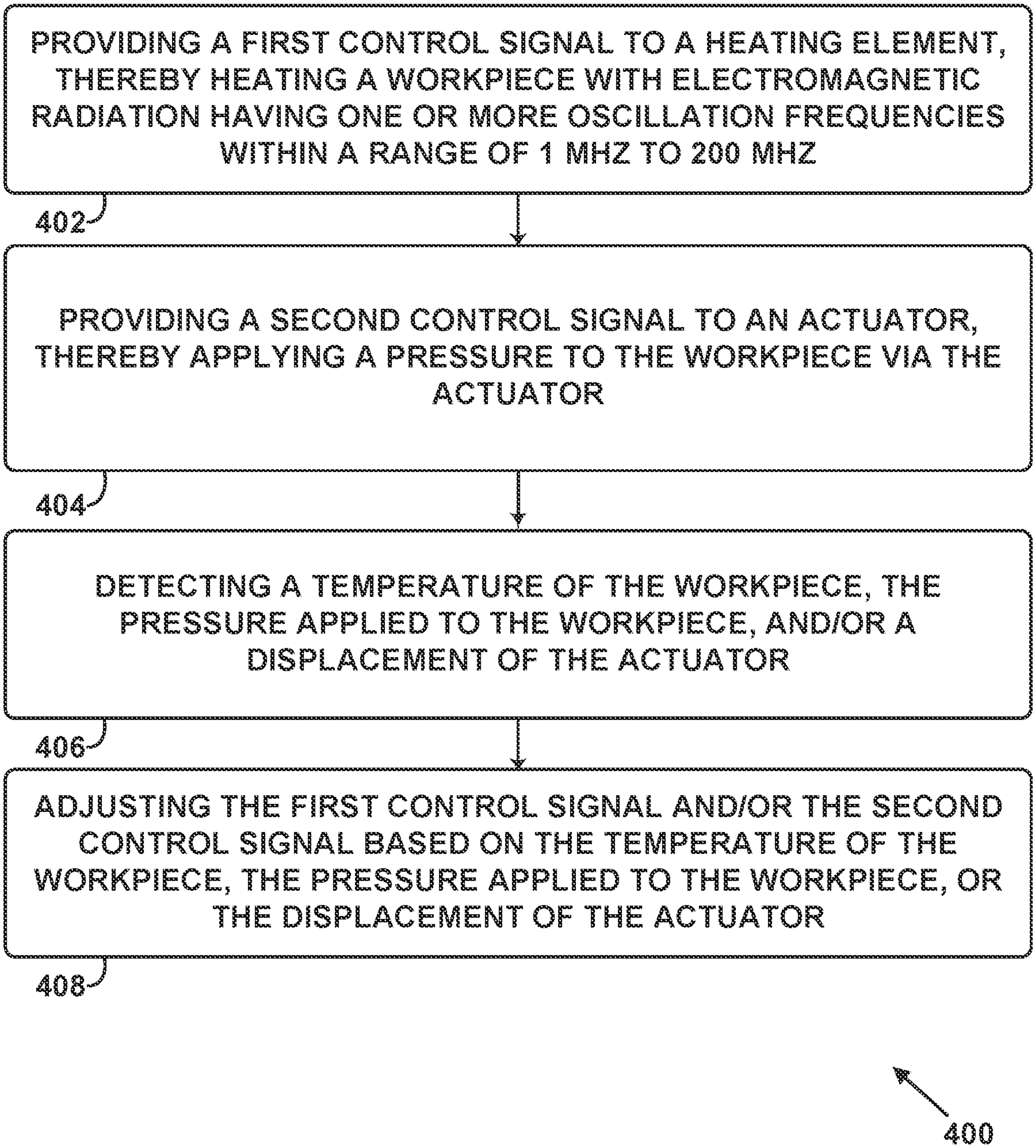

FIG. 8

CLOSED LOOP COMPOSITE WELDING AND BONDING SYSTEM USING RADIO-FREQUENCY AND PRESSURE

CROSS-REFERENCE TO RELATED APPLICATIONS

This application is a § 371 national stage of international application no. PCT/US2022/034250, filed on Jun. 21, 2022, which claims priority to U.S. Provisional Patent Application No. 63/366,680, filed on Jun. 20, 2022, and U.S. Provisional Application No. 63/212,995, filed Jun. 21, 2021, the entire contents of all of which are incorporated by reference herein.

BACKGROUND

Various methods are used for welding polymers or composite materials together, such as induction welding, resistance welding, and ultrasonic welding. While these methods have industrial applications, recent focus on rapid manufacturing in the automotive and aerospace industry has highlighted the need for faster, safer, and more reliable heating and welding methods.

SUMMARY

A first example is a method comprising: providing a first control signal to a heating element, thereby heating a workpiece with electromagnetic radiation having one or more oscillation frequencies within a range of 1 MHz to 200 MHz; providing a second control signal to an actuator, thereby applying a pressure to the workpiece via the actuator; detecting a temperature of the workpiece, the pressure applied to the workpiece, and/or a displacement of the actuator; and adjusting the first control signal and/or the second control signal based on the temperature of the workpiece, the pressure applied to the workpiece, or the displacement of the actuator.

A second example is a non-transitory computer readable medium storing instructions that, when executed by a bonding system, cause the bonding system to perform functions comprising: providing a first control signal to a heating element, thereby beating a workpiece with electromagnetic radiation having one or more oscillation frequencies within a range of 1 MHz to 200 MHz; providing a second control signal to an actuator, thereby applying a pressure to the workpiece via the actuator; detecting a temperature of the workpiece, the pressure applied to the workpiece, and/or a displacement of the actuator: and adjusting the first control signal and/or the second control signal based on the temperature of the workpiece, the pressure applied to the workpiece, or the displacement of the actuator.

A third example is a bonding system comprising: a signal generator; a beating element; an actuator; an infrared camera; a pressure sensor and/or a displacement sensor: one or more processors; and a computer readable medium storing instructions that, when executed by the one or more processors, cause the bonding system to perform functions comprising: providing a first control signal to a heating element, thereby heating a workpiece with electromagnetic radiation having one or more oscillation frequencies within a range of 1 MHz to 200 MHz: providing a second control signal to an actuator, thereby applying a pressure to the workpiece via the actuator; detecting a temperature of the workpiece, the pressure applied to the workpiece, and/or a displacement of the actuator; and adjusting the first control signal and/or the second control signal based on the temperature of the workpiece, the pressure applied to the workpiece, or the displacement of the actuator.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein. "substantially" or "about" means within +/−0-5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

BRIEF DESCRIPTION OF THE DRAWINGS

FIG. 8 is a block diagram of a method, according to an example.

DETAILED DESCRIPTION

As noted above, faster, safer, and more reliable welding methods and systems are needed. Examples of such methods and devices are discussed below.

A method includes providing a first control signal to a heating element, thereby heating a workpiece with electromagnetic radiation having one or more oscillation frequencies within a range of 1 MHz to 200 MHz. For example, a signal generator and/or an amplifier (e.g., controlled by a computing device) provides the first control signal that oscillates at frequencies within the range of 1 MHz to 200 MHz. The beating element, which can take the form of a planar radio frequency (RF) antenna embedded within a dielectric substrate or base, receives the first control signal and responsively generates the electromagnetic radiation within the range of 1 MHz to 200 MHz. In some examples, the workpiece to be processed includes a layer infused with carbonaceous material such as carbon fibers sandwiched between two thermoplastic or thermoset layers. The electromagnetic radiation excites free electrons within the carbonaceous materials within the workpiece, which in turn generates heat that can bond the layers together via softening and/or melting.

Additionally, a computing device provides a second control signal to an actuator, thereby applying a pressure to the workpiece via the actuator. In an example, the heating element generates the electromagnetic radiation from below the workpiece and the actuator applies the pressure to the workpiece from above. Other geometries are possible. In some examples, the heating element could be integrated with the actuator that presses the workpiece onto a dielectric base. The actuator typically takes the form of a motorized piston configured to apply a controlled pressure to the workpiece or configured to maintain a controlled displacement with respect to a reference position.

In various examples, the computing device detects a temperature of the workpiece, the pressure applied to the workpiece, and/or a displacement of the actuator and adjusts the first control signal and/or the second control signal based on the temperature of the workpiece, the pressure applied to the workpiece, or the displacement of the actuator. The displacement of the actuator is generally a proxy for a controlled thickness of the workpiece under pressure. Thus, in various applications, closed-loop feedback is used to control the temperature of the workpiece during the welding process, the pressure applied to the workpiece during the welding process, and/or the displacement of the actuator (e.g., the thickness of the workpiece) during the welding process.

Figure 1:
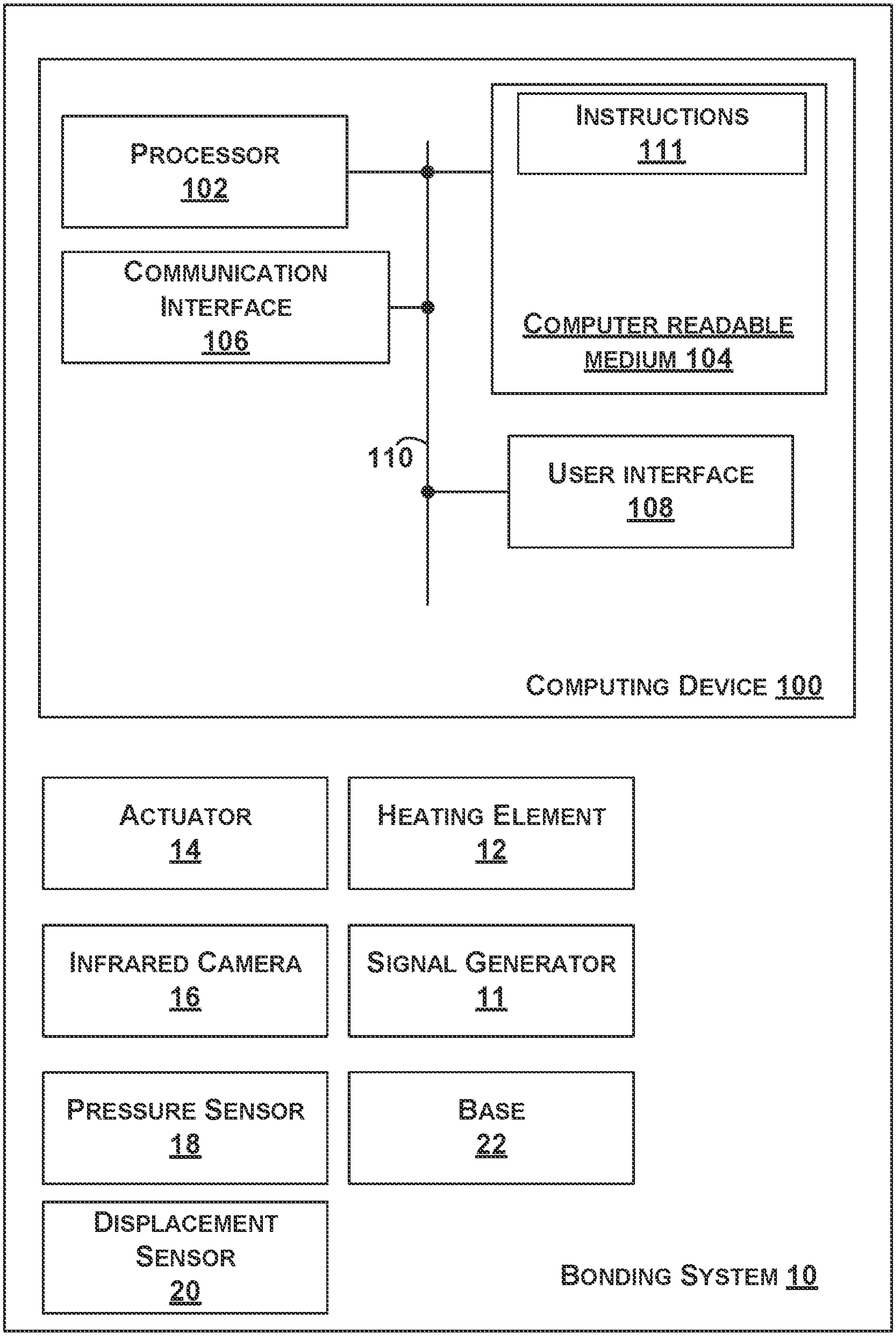
FIG. 1 is a block diagram of a bonding system, according to an example.

FIG. 1 is a block diagram of a bonding system 10. The bonding system 10 includes a signal generator 11, a heating element 12, an actuator 14, an infrared camera 16, a pressure sensor 18, a displacement sensor 20, a base 22, and a computing device 100.

The signal generator 11 is controllable by the computing device 100 to generate signals of varying amplitudes, oscillation frequencies, and waveforms. The signal generator 11 can include an integrated or standalone amplifier as well.

The heating element 12 can take the form of a planar radio frequency (RF) antenna embedded within a dielectric substrate or base. The heating element 12 is configured to generate an electromagnetic field within and adjacent to a gap between a first terminal and a second terminal of the heating element 12 in response to receiving control signals from the signal generator 11.

The actuator 14 typically takes the form of a motorized piston. The computing device 100 can cause the actuator 14 to apply a controlled pressure to a workpiece or to maintain a controlled displacement, depending on the application.

The infrared camera 16 can take the form of any imaging device configured to sense the wavelengths of infrared radiation emitted from the workpiece. The computing device 100 can use this information to determine a temperature of the workpiece.

The pressure sensor 18 typically takes the form of a load cell.

The displacement sensor 20 typically takes the form of a potentiometer. For example, the extendable actuator can be mechanically coupled to the adjustable terminal of the potentiometer, which causes the potentiometer to exhibit a resistance that is dependent on the displacement of the actuator. In some examples, the pressure sensor 18 and the displacement sensor 20 are integrated together.

The base 22 is typically constructed of non-conductive and/or low dielectric material and provides a supporting structure for the other components of the bonding system 10.

The computing device 100 includes one or more processors 102, a non-transitory computer readable medium 104, a communication interface 106, and a user interface 108. Components of the computing device 100 are linked together by a system bus, network, or other connection mechanism 110.

The one or more processors 102 can be any type of processor(s), such as a microprocessor, a field programmable gate array; a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can store instructions 111. The instructions 111 are executable by the one or more processors 102 to cause the computing device 100 (e.g., the bonding system 10) to perform any of the functions or methods described herein.

The communication interface 106 can include hardware to enable communication within the computing device 100 and/or between the computing device 100 and one or more other devices. The hardware can include any type of input and/or output interfaces, a universal serial bus (USB), PCI Express, transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 can also include analog-to-digital converters (ADCs) or digital-to-analog converters (DACs) that the computing device 100 can use to control various components of the computing device 100 or external devices.

The user interface 108 can include any type of display component configured to display data. As one example, the user interface 108 can include a touchscreen display. As another example, the user interface 108 can include a flat-panel display, such as a liquid-crystal display (LCD) or a light-emitting diode (LED) display. The user interface 108 can include one or more pieces of hardware used to provide data and control signals to the computing device 100. For instance, the user interface 108 can include a mouse or a pointing device, a keyboard or a keypad, a microphone, a touchpad, or a touchscreen, among other possible types of user input devices. Generally, the user interface 108 can enable an operator to interact with a graphical user interface (GUI) provided by the computing device 100 (e.g., displayed by the user interface 108).

Figure 2:
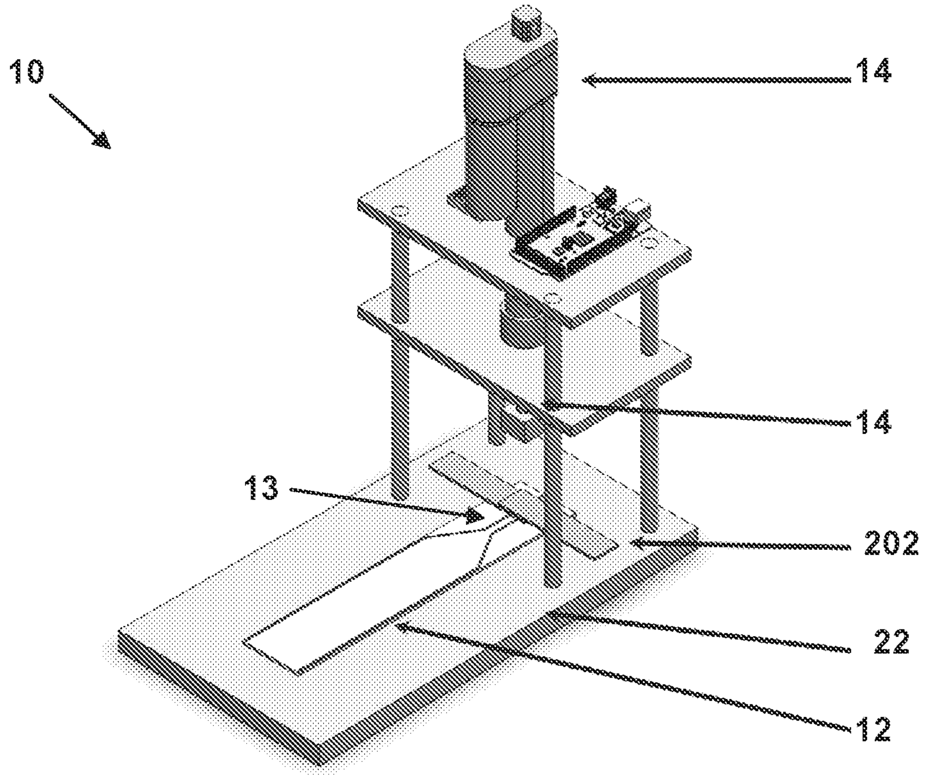
FIG. 2 is a perspective view of a bonding system, according to an example.

FIG. 2 is a perspective view of the bonding system 10. As shown, the heating element 12 is positioned on the base 22 and a workpiece 202 is positioned on a terminal portion 13 of the heating element 12. The conductive copper terminal strips of the terminal portion 13 of the heating element 12 are embedded in a non-conductive material, and thus the workpiece 202 generally does not make physical contact with the terminal strips of the beating element 12. The base 22 provides a support for the actuator 14, which takes the form of a controllable piston.

Figure 3:
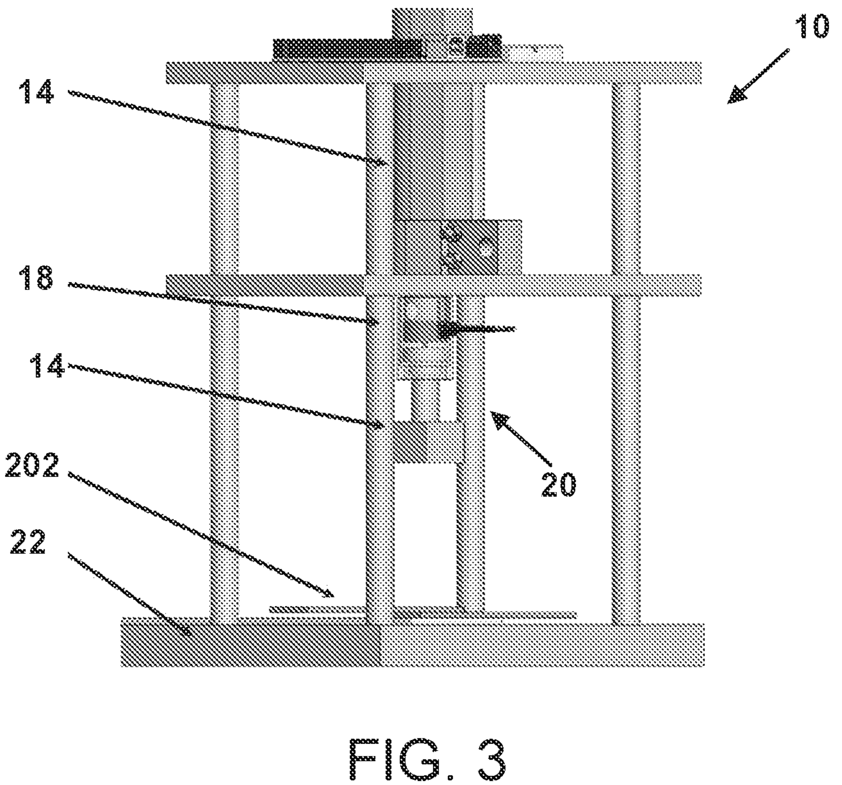
FIG. 3 is a perspective view of a bonding system, according to an example.

FIG. 3 is another perspective view of the bonding system 10. As shown, the pressure sensor 18 and/or the displacement sensor 20 can be integrated with the actuator 14.

Figure 4:
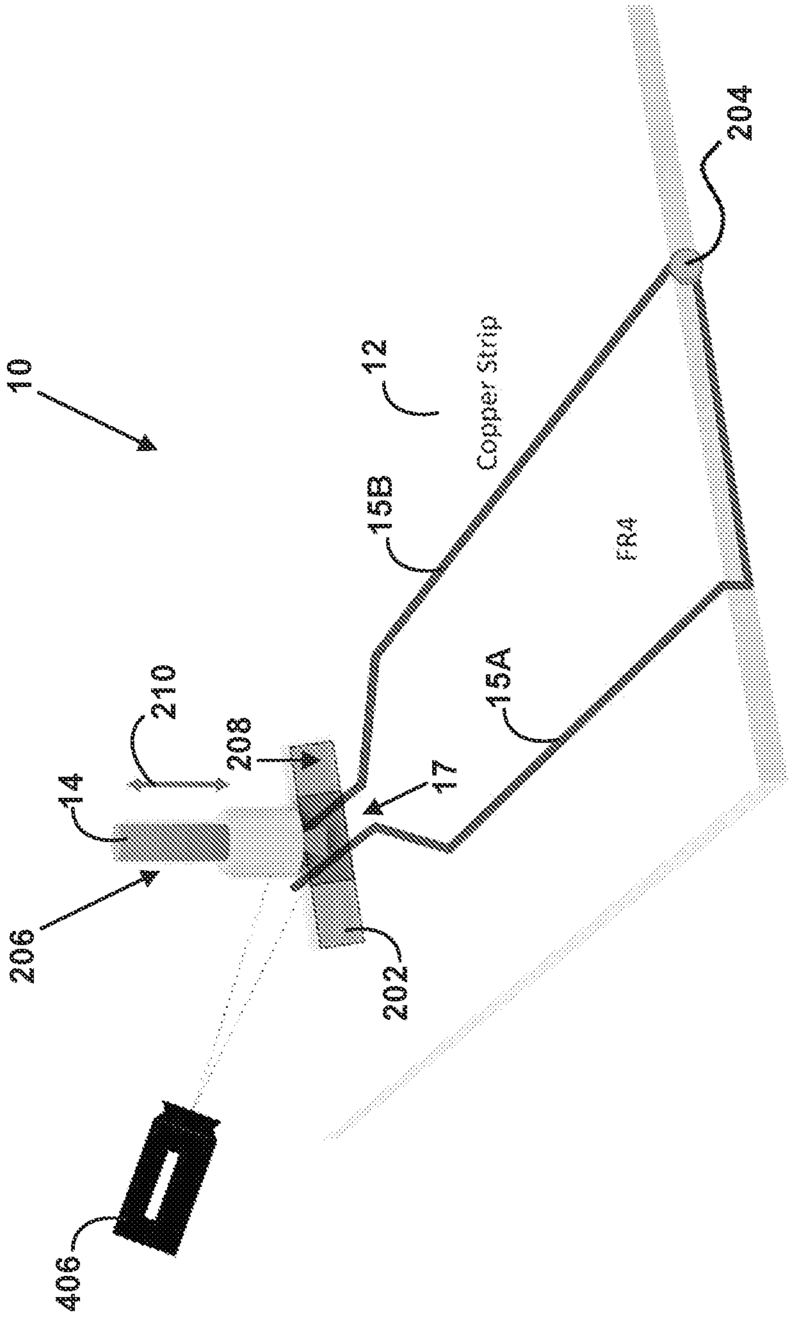
FIG. 4 shows functionality related to a bonding system, according to an example.

FIG. 4 shows functionality related to the bonding system 10. For example, the computing device 100 causes the signal generator 11 to provide a first control signal 204 to the heating element 12, thereby heating the workpiece 202 with electromagnetic radiation having one or more oscillation frequencies within a range of 1 MHz to 200 MHz.

The electromagnetic radiation propagates into the workpiece 202 and is absorbed by carbon-based materials or other electrically conductive materials within the workpiece 202, thereby generating ohmic heating within the workpiece 202.

As shown in FIG. 4, the signal generator 11 provides the first control signal 204 between a first terminal 15A of the heating element 12 and a second terminal 15B of the heating element 12, thereby generating an electromagnetic field within and adjacent to a gap 17 between the first terminal 15A and the second terminal 15B.

Additionally, the computing device 100 provides a second control signal 206 to the actuator 14, thereby applying a pressure 208 to the workpiece 202 via the actuator 14. As such, the actuator 14 is extended and makes contact with the workpiece 202 (or perhaps makes contact with a spacer between the actuator 14 and the workpiece 202).

Thus, beating the workpiece 202 can involve heating the workpiece 202 with the electromagnetic radiation from a first side (e.g., bottom) of the workpiece 202 while the actuator 14 applies the pressure 208 to the workpiece 202 at a second side (e.g., top) of the workpiece 202 opposite the first side.

To incorporate closed-loop control of the bonding and/or welding of the workpiece 202, the computing device 100 detects a temperature of the workpiece 202, the pressure 208 applied to the workpiece 202 by the actuator 14, and/or a displacement 210 of the actuator 14. The computing device 100 detects the temperature of the workpiece 202 using the infrared camera 16, detects the pressure 208 applied to the workpiece 202 with the pressure sensor 18, and detects the displacement 210 of the actuator 14 with the displacement sensor 20.

Furthermore, the computing device 100 adjusts the first control signal 204 and/or the second control signal 206 based on the temperature of the workpiece 202, the pressure 208 applied to the workpiece 202, or the displacement 210 of the actuator 14.

In various bonding processes, it may be desirable to maintain the temperature of the workpiece 202 as close as possible to a target temperature, to help produce a high quality, reliable, and reproducible bonding process. As such, the computing device 100 adjusts the first control signal 204 in a manner that reduces a temperature difference between the temperature of the workpiece and the target temperature (e.g., 90° C. to 110° C. for a workpiece including polyactic acid (PLA), or up to 320° C. for a workpiece including polyether ether ketone (PEEK)). For example, known control algorithms can be used to increase or decrease the amplitude of the first control signal 204 and/or change the frequencies of the first control signal 204 as needed to have the temperature of the workpiece 202 remain stable near the target temperature.

In some examples, the target temperature is set via user input. That is, prior to adjusting the first control signal 204, the computing device 100 receives, via the user interface 108, an input indicating the target temperature. Additionally, a maximum temperature can be set via user input. That is, the computing device 100 can control the first control signal 204 such that the temperature of the workpiece 202 is kept below the maximum temperature, for example, a temperature at which the materials of the workpiece 202 are known to (e.g., irreversibly) break down or deteriorate.

Likewise, it may be desirable to maintain the pressure 208 applied to the workpiece 202 as close as possible to a target pressure, to help produce a high quality, reliable, and reproducible bonding process. As such, the computing device 100 adjusts the second control signal 206 in a manner that reduces a pressure difference between the pressure 208 and the target pressure (e.g., 100 kPa to 10 MPa or 300 kPa to 500 kPa). For example, known control algorithms can be used to change the second control signal 206 as needed to have the pressure 208 remain stable near the target pressure.

In some examples, the target pressure is set via user input. That is, prior to adjusting the second control signal 206, the computing device 100 receives, via the user interface 108, an input indicating the target pressure.

In turn, adjustments to the first control signal 204 (e.g., the heating element 12) may be performed based on monitoring the pressure 208. As such, the computing device 100 may initially enable (e.g., turn on) the first control signal 204 in response to determining that the pressure difference is less than a threshold pressure difference. That is, the computing device 100 may refrain from heating the workpiece 202 until a suitable pressure 208 is measured.

Similarly, it may be desirable to maintain the displacement 210 of the actuator 14 as close as possible to a target displacement, to help produce a high quality, reliable, and reproducible bonding process. As such, the computing device 100 adjusts the second control signal 206 in a manner that reduces a displacement difference between the displacement 210 and the target displacement. For example, known control algorithms can be used to change the second control signal 206 as needed to have the displacement 210 remain stable near the target displacement. In some examples, the target displacement can be defined as a thickness of the workpiece 202 as defined by the pressure 208 applied by the actuator 14.

In some examples, the target displacement 210 is set via user input. That is, prior to adjusting the second control signal 206, the computing device 100 receives, via the user interface 108, an input indicating the target displacement 210.

In some examples, the computing device 100 refrains from controlling the displacement 210 by adjusting the second control signal 206 until the computing device 100 determines that the temperature of the workpiece 202 is within a "pliable" range of 40° C. to 360° C., depending on the materials included in the workpiece 202. Until the workpiece 202 reaches a pliable temperature, the workpiece 202 will generally act as an uncompressible solid and displacement control will generally not be practical or desirable. As such, the computing device 100 adjusts the second control signal 206 based on determining that the temperature of the workpiece 202 has been within the pliable range for at least a threshold duration.

Generally, the workpiece 202 can take many different forms. For example, the workpiece 202 can be a combination of well-defined and distinct layers of materials that are heated and pressurized to be bonded together. More specifically, the workpiece can take the form of a "sandwich" structure having two composite layers that are bonded together by melting and pressurizing an adhesive layer that contains electrically conductive carbon-based particles or fibers within the adhesive layer.

However, the workpiece 202 can generally include any combination of materials. In an example, the workpiece 202 can take the form of a composite material having electrically conductive carbon-based particles or fibers dispersed evenly throughout the workpiece 202 or in targeted areas of the workpiece 202.

Figure 5:
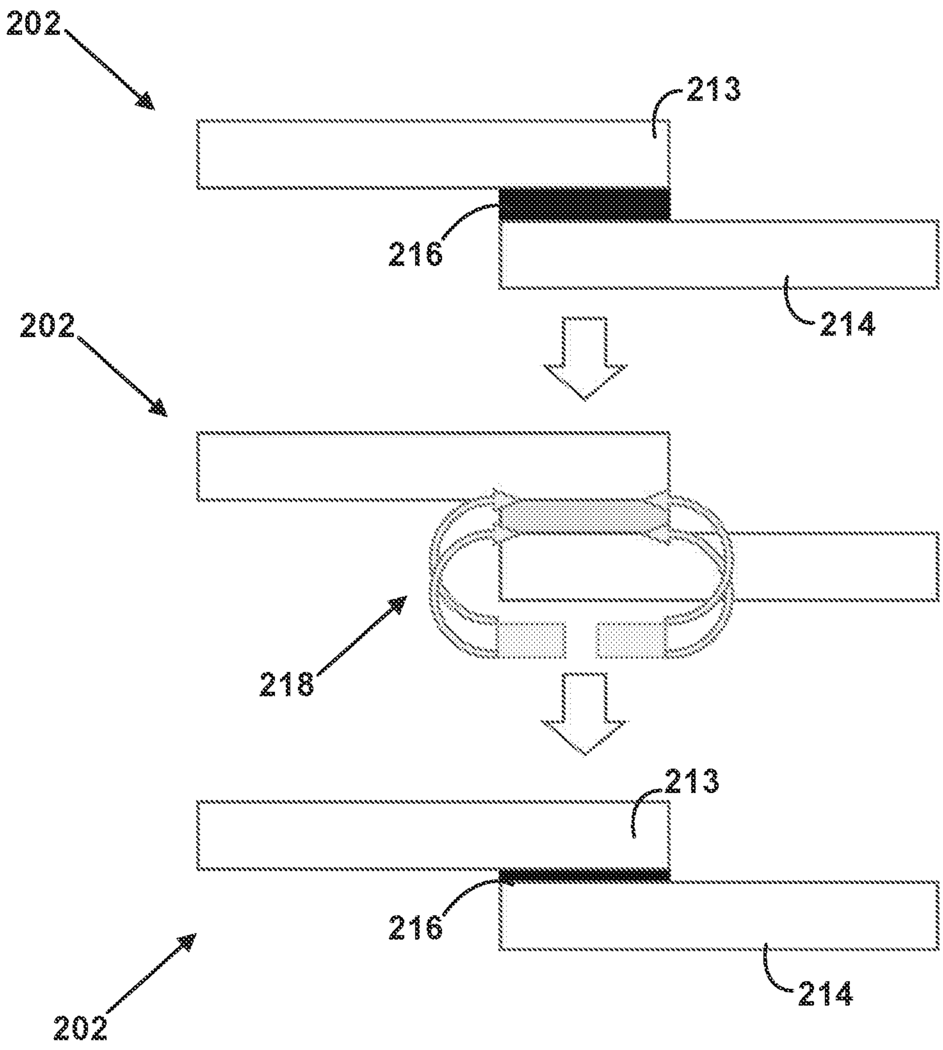
FIG. 5 shows functionality related to a bonding system, according to an example.

FIG. 5 shows functionality related to the bonding system 10. In some examples, the workpiece 202 includes a non-conductive matrix material having electrically conductive particles dispersed therein. For example, the non-conductive matrix material can include a ceramic, a polymer, a thermoplastic, or a thermoset. Additionally, the electrically conductive particles can include carbon nanotubes, graphene, graphite, graphene oxide, laser induced graphene, carbon black, carbon fibers, char, or MXene.

In some examples, the workpiece 202 includes a first layer 213 (e.g., having a dielectric constant less than 3), a second layer 214 (e.g., having a dielectric constant less than 3), and a third layer 216 that includes electrically conductive particles between the first layer 213 and the second layer 214.

As such, the computing device 100 causes the signal generator 11 to provide the first control signal 204, which heats the electrically conductive particles in the third layer 216 via the electromagnetic radiation 218, thereby transferring heat via conduction to the first layer 213 and to the second layer 214 and creating a mechanical bond between the first layer 213 and the second layer 214. The pressure 208 applied by the actuator 14 also contributes to forming the mechanical bond. As such, the third layer 216 can be applied, for example by being sprayed or brushed, onto the first layer 213 and/or onto the second layer 214 prior to heating the electrically conductive particles.

In various examples, the computing device 100 will determine that the bonding process is complete and operate the bonding system 10 accordingly. For example, the computing device 100 determines that the temperature of the workpiece 202, the pressure 208 applied to the workpiece, and/or the displacement 210 of the actuator 14 satisfies one or more performance criteria for a threshold duration and responsively disables the first control signal 204 and/or the second control signal 206 based on the determination.

Figure 6:
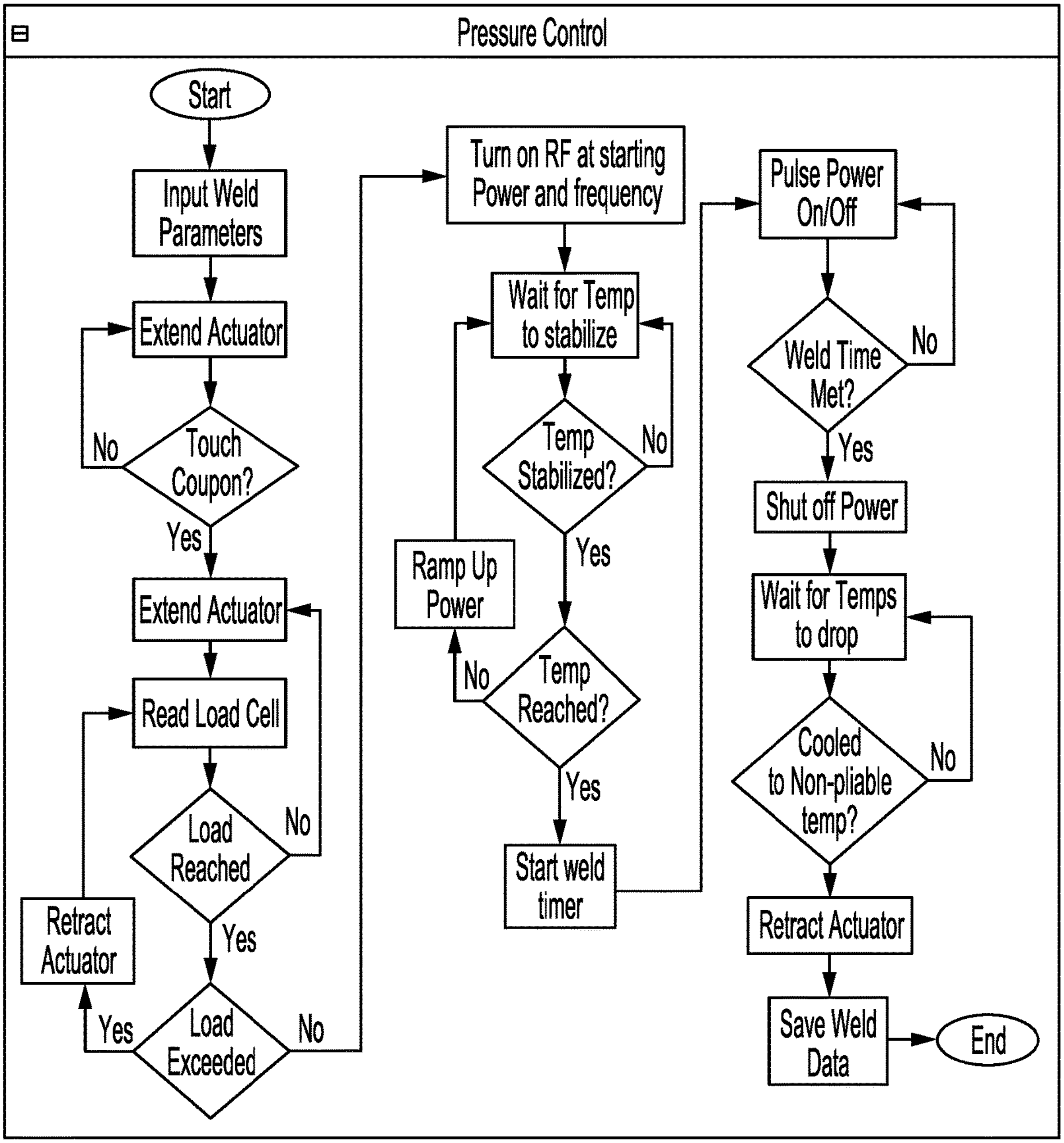
FIG. 6 is a block diagram of functionality related to a bonding system, according to an example.

FIG. 6 is a block diagram of functionality related to the bonding system 10. A process begins by the computing device 100 receiving, via the user interface 108, parameters of a welding process. The parameters can include process timing information, target temperatures, target displacements, and/or target pressures. The computing device 100 causes the actuator 14 to be extended until the actuator 14 makes contact with the workpiece 202 or makes contact with a spacer in contact with the workpiece 202.

Next, the computing device 100 extends or retracts the actuator 14 as needed until the pressure sensor 18 indicates a desired pressure 208 being applied by the actuator 14.

The computing device 100 then enables and controls the first control signal 204 (e.g., the heating element 12) until the infrared camera 16 senses a stable temperature within the target temperature range for the workpiece 202.

Once the computing device 100 determines that a threshold duration has passed while the temperature and pressure measurements are in accordance with the process parameters, the first control signal 204 is disabled.

Once the computing device 100 determines that the workpiece 202 has cooled to a non-pliable temperature (e.g., 40° C. to 60° C.), the computing device 100 retracts the actuator 14, and the workpiece 202 can be removed.

Figure 7:
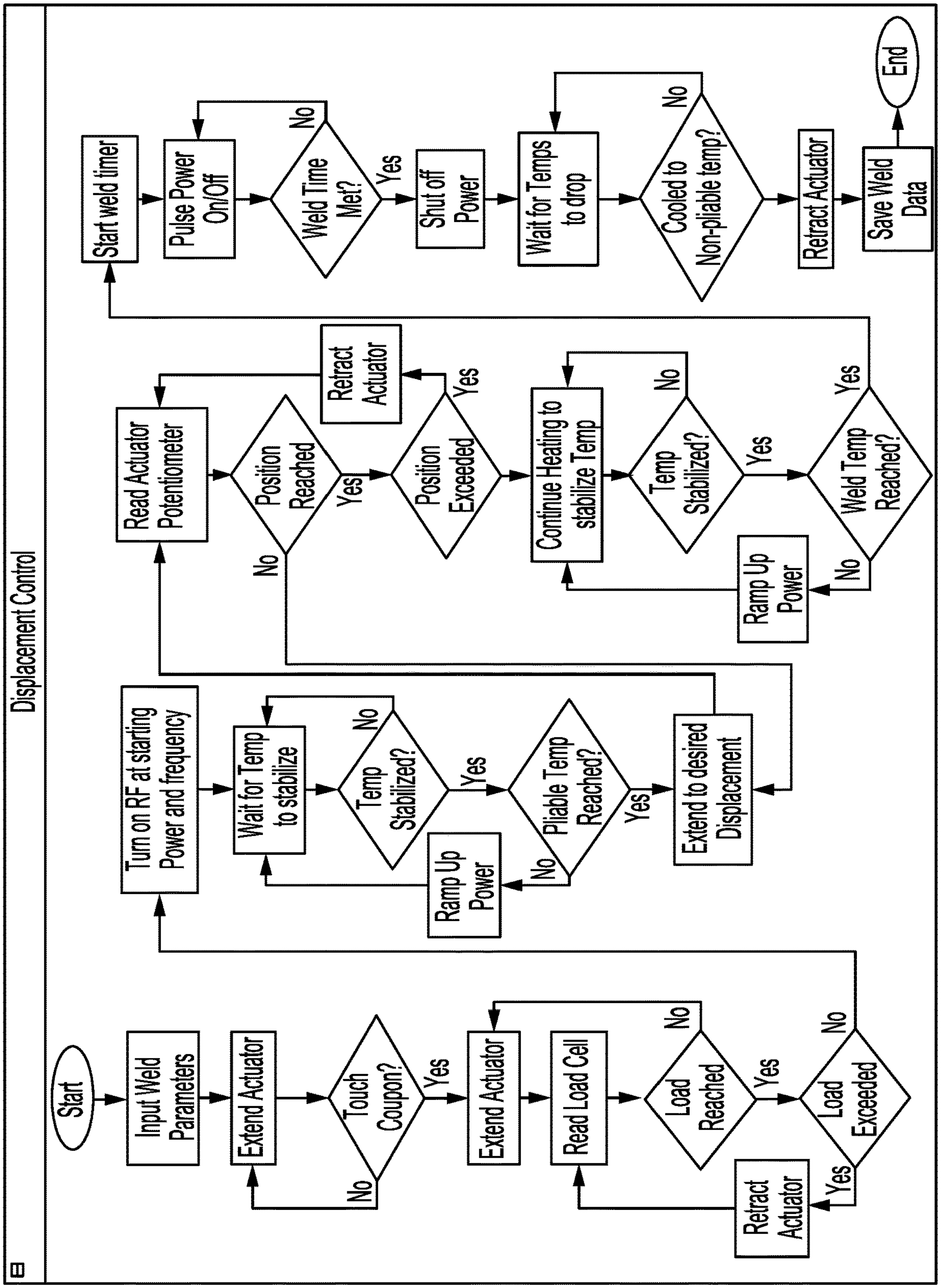
FIG. 7 is a block diagram of functionality related to a bonding system, according to an example.

FIG. 7 is a block diagram of functionality related to the bonding system 10. A process begins by the computing device 100 receiving, via the user interface 108, parameters of a welding process. The parameters can include process timing information, target temperatures, target displacements, and/or target pressures. The computing device 100 causes the actuator 14 to be extended until the actuator 14 makes contact with the workpiece 202 or makes contact with a spacer in contact with the workpiece 202.

Next, the computing device 100 extends or retracts the actuator 14 as needed until the pressure sensor 18 indicates a desired pressure 208 being applied by the actuator 14.

The computing device 100 then enables and controls the first control signal 204 (e.g., the heating element 12) until the infrared camera 16 senses a stable temperature within a pliable temperature range for the workpiece 202 (e.g., 40° C. to 360° C., depending on the materials included in the workpiece 202).

Thereafter, computing device 100 controls the displacement 210 of the actuator 14 in accordance with the input parameters and the computing device 100 uses the heating element 212 to heat the workpiece 202 in accordance with the input parameters.

Once the computing device 100 determines that a threshold duration has passed while the temperature and displacement measurements are in accordance with the process parameters, the first control signal 204 is disabled.

Once the computing device 100 determines that the workpiece 202 has cooled to a non-pliable temperature (e.g., 40° C. to 60° C.), the computing device 100 retracts the actuator 14, and the workpiece 202 can be removed.

FIG. 8 is a block diagram of a method 400 performed by the bonding system 10. As shown in FIG. 8, the method 400 includes one or more operations, functions, or actions as illustrated by blocks 402, 404, 406, and 408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 includes the computing device 100 providing the first control signal 204 to the heating element 112, thereby heating the workpiece 202 with the electromagnetic radiation 218 having one or more oscillation frequencies within the range of 1 MHz to 200 MHz. Functionality related to block 402 is described above with reference to FIGS. 2-5.

At block 404, the method 400 includes the computing device 100 providing the second control signal 206 to the actuator 14, thereby applying the pressure 208 to the workpiece 202 via the actuator 14. Functionality related to block 404 is described above with reference to FIGS. 2-5.

At block 406, the method 400 includes the computing device 100 detecting the temperature of the workpiece 202, the pressure 208 applied to the workpiece 202, and/or the displacement 210 of the actuator 14. Functionality related to block 406 is described above with reference to FIGS. 2-5.

At block 408, the method 400 includes the computing device 100 adjusting the first control signal 204 and/or the second control signal 206 based on the temperature of the workpiece 202, the pressure 208 applied to the workpiece 202, or the displacement 210 of the actuator 14. Functionality related to block 408 is described above with reference to FIGS. 2-5.

Figure 9:
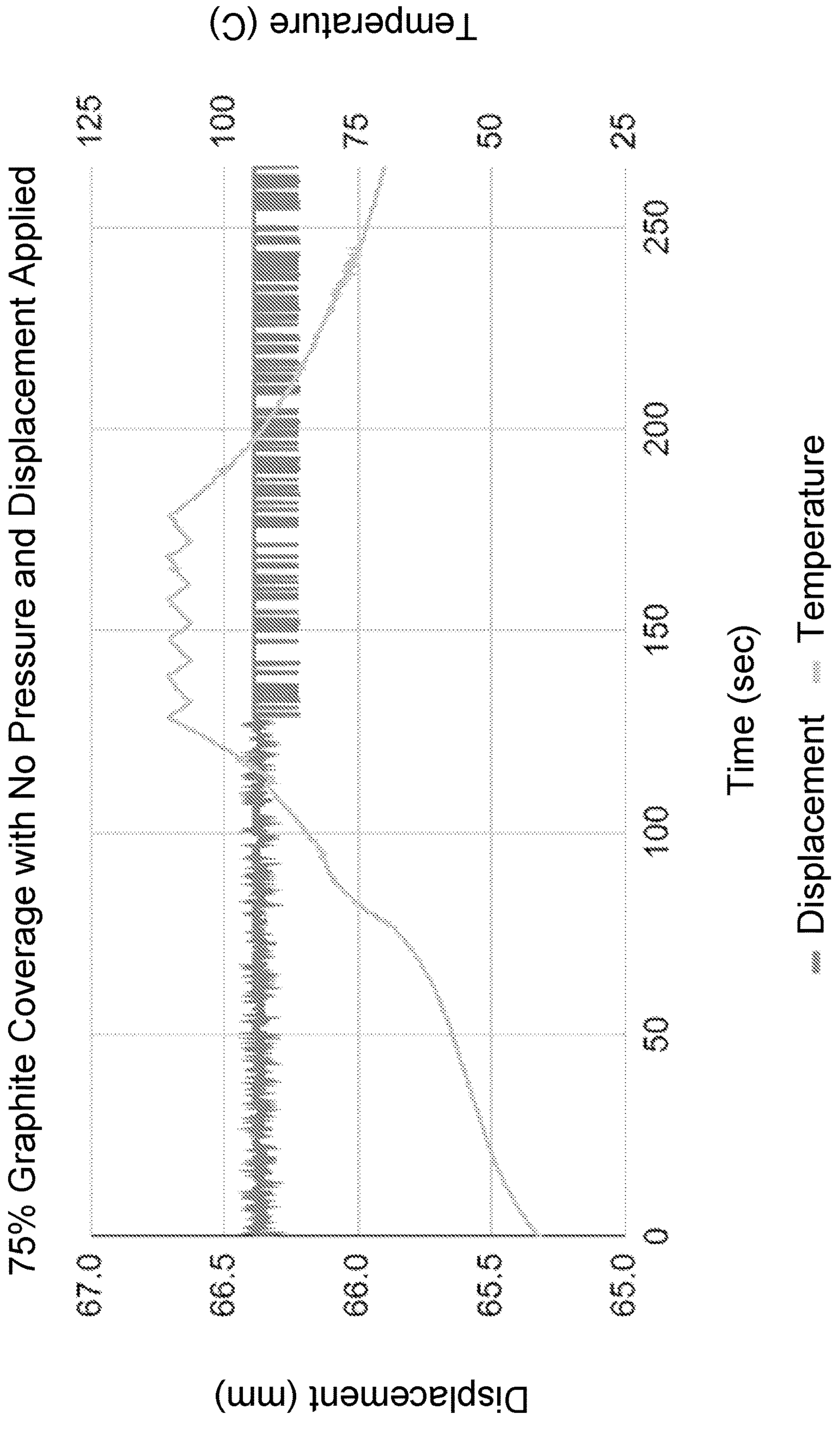
FIG. 9 shows results of a bonding process performed by a bonding system, according to an example.

FIG. 9 shows results of a bonding process performed by the bonding system 10. In FIGS. 9-14, the temperature refers to the temperature of the workpiece 202 detected by the infrared camera 16, graphite coverage % refers to the amount of overlapping area between layers of the workpiece 202 to be bonded that are covered with carbon-based electrically conductive materials, pressure refers to pressure applied by the actuator 41, and displacement refers to displacement of the actuator 41.

As shown in FIG. 9, the temperature is increased from about 40° C. to plateau at about 112° C., and then the temperature is allowed to cool. No displacement or pressure control was performed.

Figure 10:
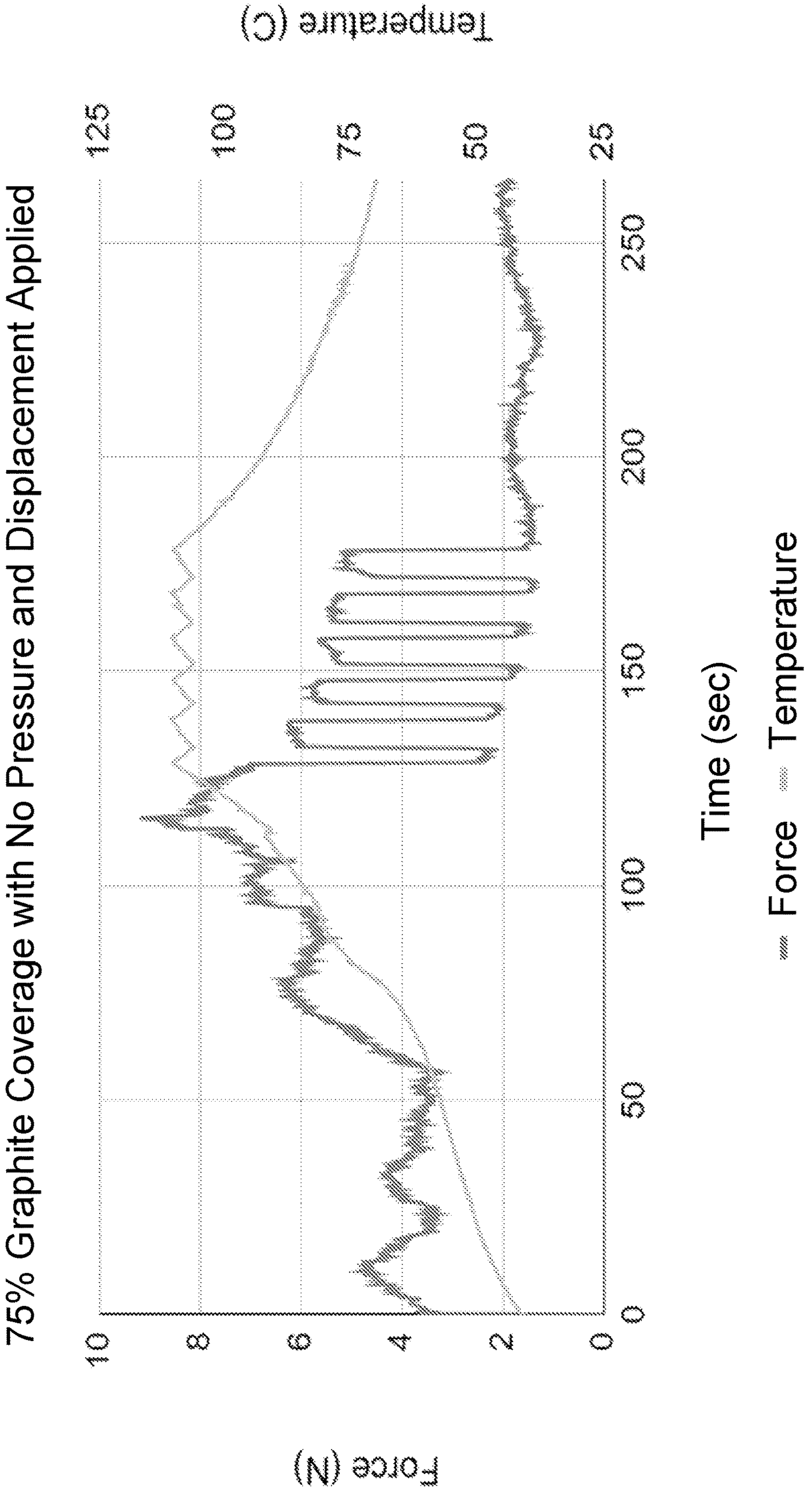
FIG. 10 shows results of a bonding process performed by a bonding system, according to an example.

FIG. 10 shows results of a bonding process performed by the bonding system 10. The temperature is increased from about 50° C. to plateau at about 105° C., and then the temperature is allowed to cool. A small force (e.g., pressure) is detected as applied by the actuator 14 to hold the workpiece 202 in place during bonding.

Figure 11:
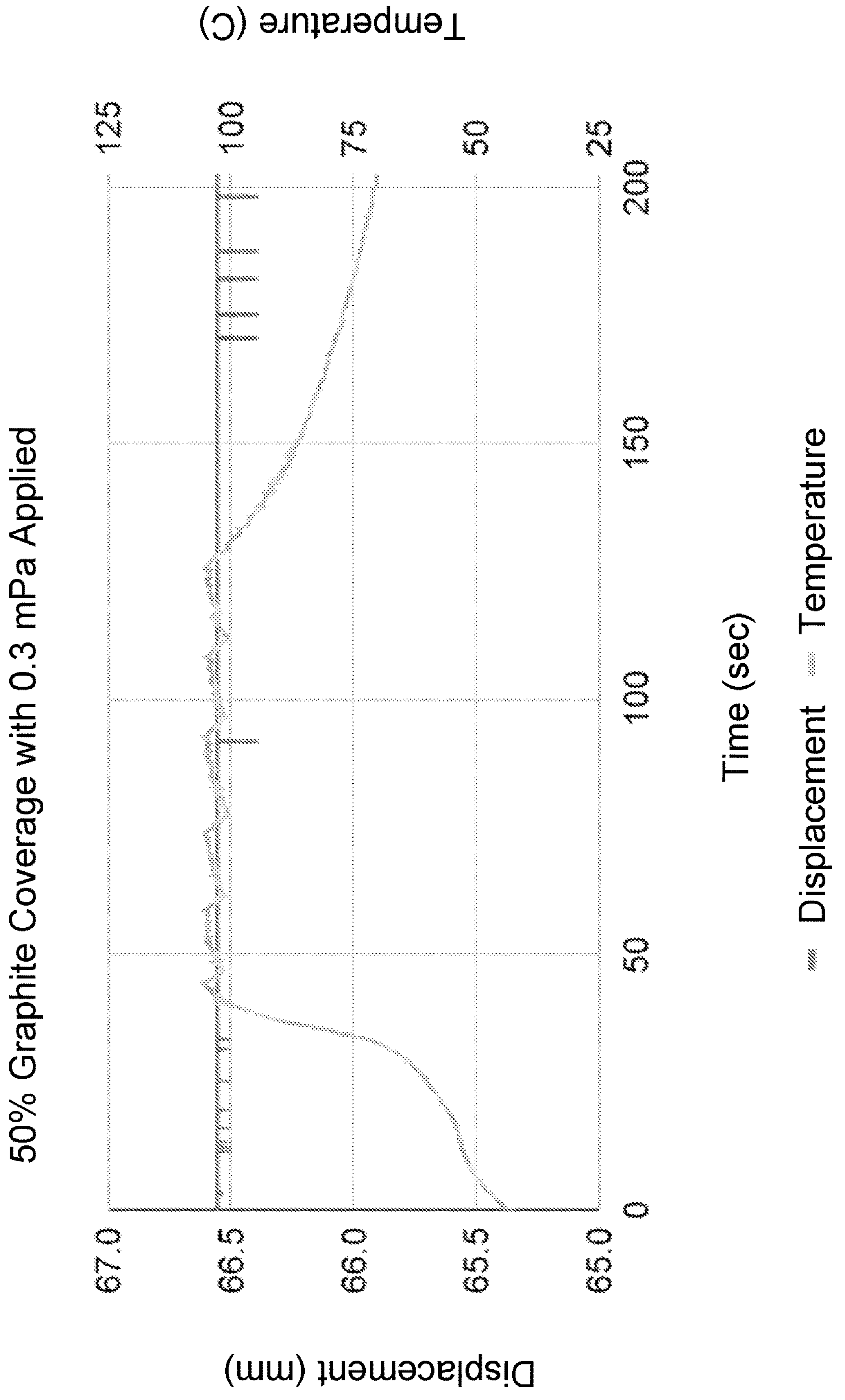
FIG. 11 shows results of a bonding process performed by a bonding system, according to an example.

FIG. 11 shows results of a bonding process performed by the bonding system 10. The bonding process involved controlling the pressure 208 applied to be about 0.3 MPa, and the displacement refers to the displacement 210. As such, the 0.3 MPa is applied prior to the heating element being enabled, and after the heating element is enabled, constant displacement control is applied.

Figure 12:
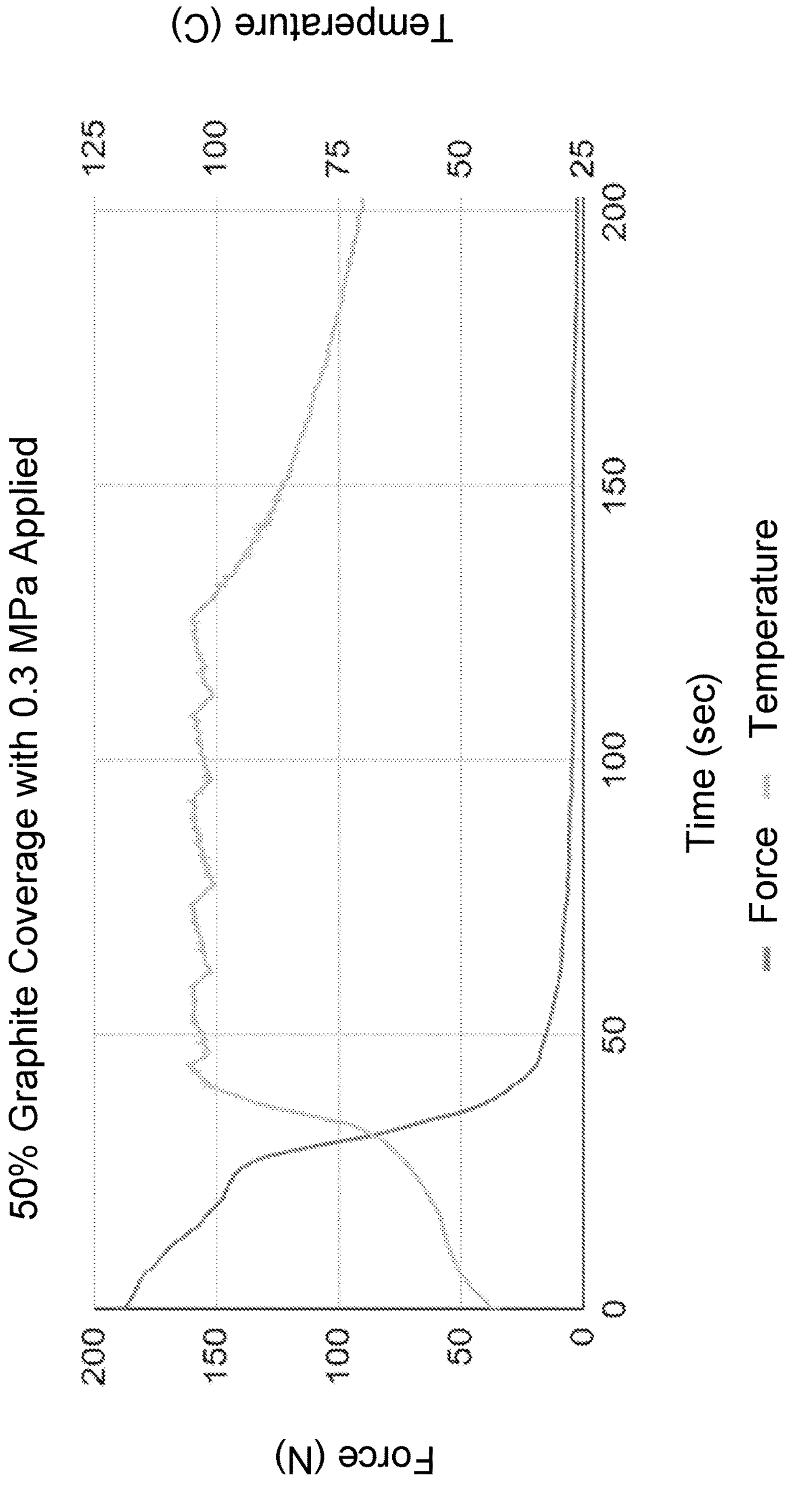
FIG. 12 shows results of a bonding process performed by a bonding system, according to an example.

FIG. 12 shows results of a bonding process performed by the bonding system 10. As shown, the pressure/force decreases as the workpiece 202 melts and transitions from a solid to a viscous liquid.

Figure 13:
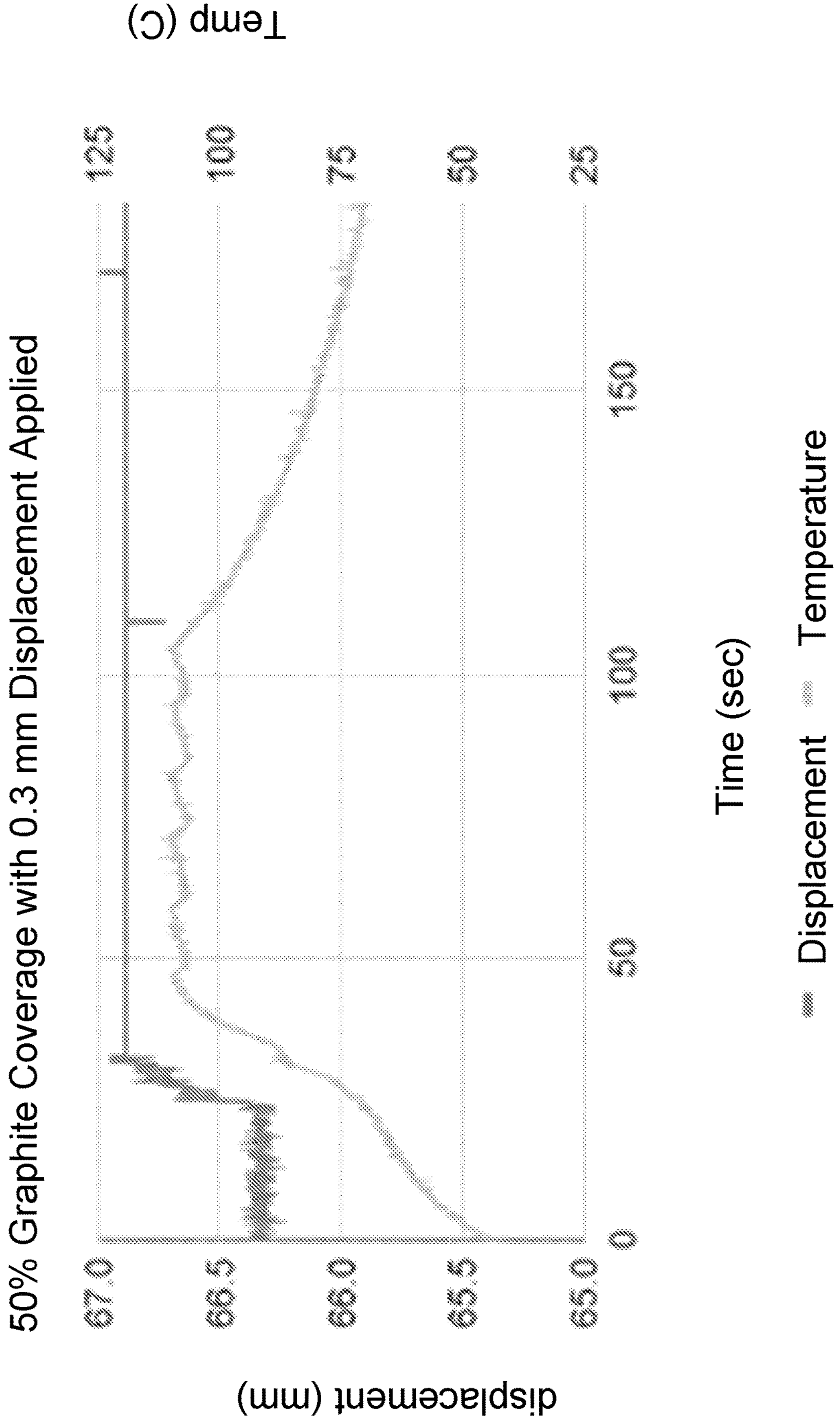
FIG. 13 shows results of a bonding process performed by a bonding system, according to an example.

FIG. 13 shows results of a bonding process performed by the bonding system 10.

Figure 14:
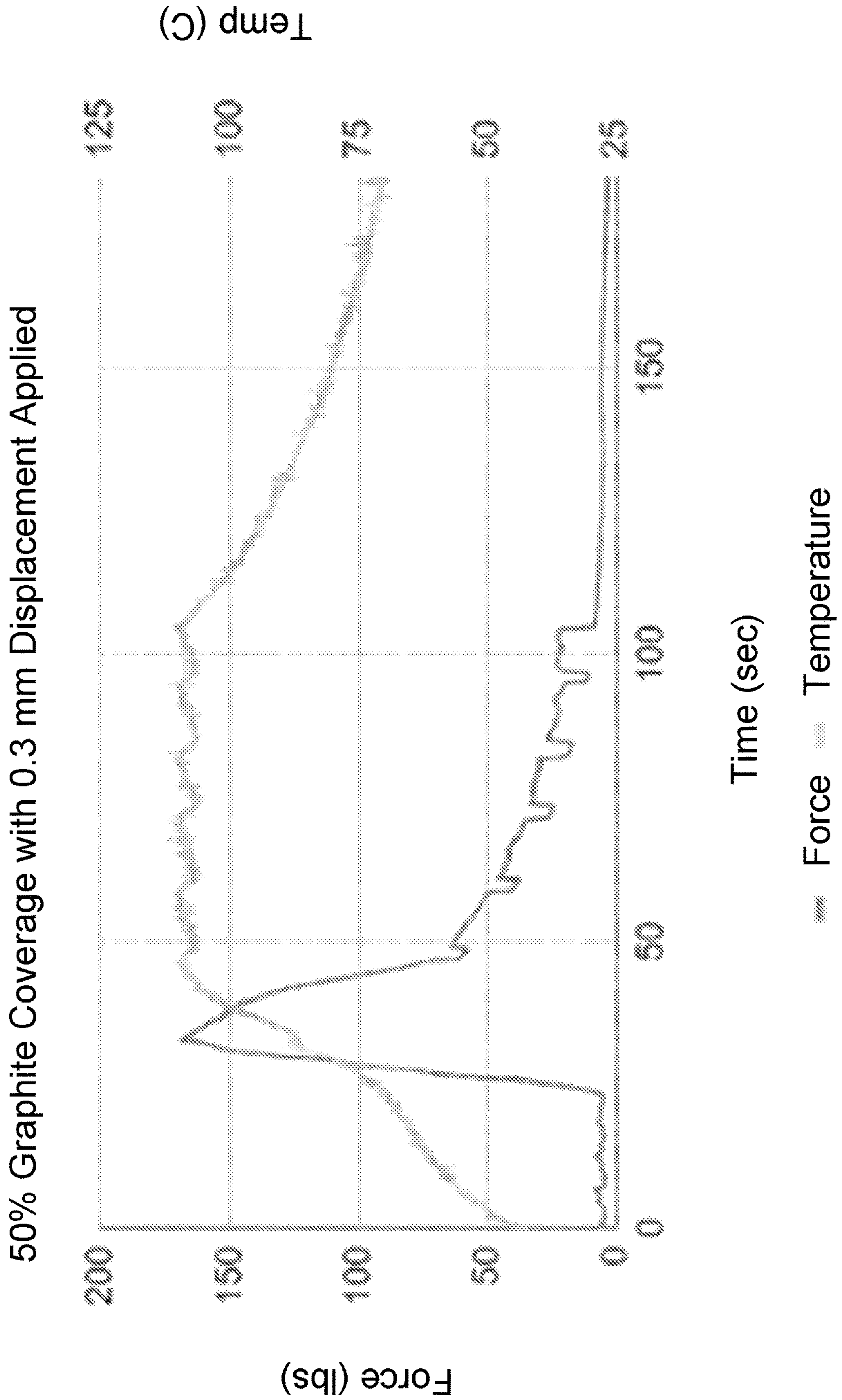
FIG. 14 shows results of a bonding process performed by a bonding system, according to an example.

FIG. 14 shows results of a bonding process performed by the bonding system 10.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:

providing a first control signal to a heating element, thereby heating a workpiece with electromagnetic radiation having one or more oscillation frequencies within a range of 1 MHz to 200 MHz;

providing a second control signal to an actuator, thereby applying a pressure to the workpiece via the actuator;

detecting, via an infrared camera, a temperature of the workpiece;

detecting, via a pressure sensor, the pressure applied to the workpiece;

adjusting the first control signal based on the temperature of the workpiece or the pressure applied to the workpiece;

adjusting the second control signal based on the temperature of the workpiece or the pressure applied to the workpiece;

making a determination that a threshold duration has passed while the temperature of the workpiece and the pressure applied to the workpiece satisfy process parameters; and disabling the first control signal and the second control signal in response to making the determination.

2. The method of claim 1, wherein adjusting the first control signal comprises adjusting the first control signal, thereby reducing a temperature difference between the temperature of the workpiece and a target temperature.

3. The method of claim 1, wherein adjusting the second control signal comprises adjusting the second control signal, thereby reducing a pressure difference between the pressure applied to the workpiece and a target pressure.

4. The method of claim 3, wherein providing the first control signal comprises providing the first control signal in response to determining that the pressure difference is less than a threshold pressure difference.

5. The method of claim 1, wherein adjusting the second control signal comprises adjusting the second control signal, thereby reducing a displacement difference between a displacement of the actuator and a target displacement.

6. The method of claim 5, wherein adjusting the second control signal comprises adjusting the second control signal based on determining that the temperature of the workpiece is within a range of 40° C. to 360° C.

7. The method of claim 6, wherein adjusting the second control signal comprises adjusting the second control signal based on determining that the temperature of the workpiece has been within the range of 40° C. to 360° C. for at least a threshold duration.

8. The method of claim 1, wherein the heating element takes a form of a radio frequency antenna.

9. The method of claim 1, wherein the workpiece comprises a non-conductive matrix material having electrically conductive particles dispersed therein.

10. The method of claim 9, wherein the non-conductive matrix material comprises a ceramic, a polymer, a thermoplastic, or a thermoset.

11. The method of claim 9, wherein the electrically conductive particles comprise carbon nanotubes, graphene, graphite, graphene oxide, laser induced graphene, carbon black, carbon fibers, char, or MXene.

12. The method of claim 1, wherein the workpiece comprises a first layer having a first dielectric constant less than 3, a second layer having a second dielectric constant less than 3, and a third layer comprising electrically conductive particles between the first layer and the second layer.

13. The method of claim 12, wherein heating the workpiece comprises heating the electrically conductive particles, thereby transferring heat via conduction to the first layer and to the second layer and creating a mechanical bond between the first layer and the second layer.

14. The method of claim 12, further comprising applying the third layer onto the first layer and/or onto the second layer prior to heating the electrically conductive particles.

15. The method of claim 1, wherein providing the first control signal comprises providing the first control signal between a first terminal of the heating element and a second terminal of the heating element, thereby generating an electromagnetic field within and adjacent to a gap between the first terminal and the second terminal.

16. The method of claim 1, wherein heating the workpiece comprises heating the workpiece with the electromagnetic radiation from a first side of the workpiece, and wherein applying the pressure to the workpiece comprises applying the pressure to the workpiece via the actuator from a second side of the workpiece opposite the first side.

17. A non-transitory computer readable medium storing instructions that, when executed by a bonding system, cause the bonding system to perform the method of claim 1.

18. A bonding system comprising:

a signal generator and/or a radio frequency (RF) power amplifier;

the heating element of claim 1;

the actuator of claim 1;

the infrared camera of claim 1;

the pressure sensor of claim 1;

one or more processors; and a non-transitory computer readable medium storing instructions that, when executed by the one or more processors, cause the bonding system to perform the method of claim 1.

19. The bonding system of claim 18, wherein adjusting the first control signal comprises adjusting the first control signal, thereby reducing a temperature difference between the temperature of the workpiece and a target temperature.

* * * * *